(12) United States Patent
Koehler et al.

(10) Patent No.: US 10,202,509 B2
(45) Date of Patent: Feb. 12, 2019

(54) COLOURING COMPOSITION COMPRISING STARCH DERIVATIVES AS A HYDROCOLLOID

(75) Inventors: Klaus Koehler, Frederiksberg (DK); Soeren Jan Jacobsen, Copenhagen S (DK)

(73) Assignee: Chr. Hansen Natural Colors A/S, Hoersholm (DK)

( * ) Notice: Subject to any disclaimer, the term of this patent is extended or adjusted under 35 U.S.C. 154(b) by 2198 days.

(21) Appl. No.: 12/666,014

(22) PCT Filed: Jul. 1, 2008

(86) PCT No.: PCT/EP2008/058447
§ 371 (c)(1),
(2), (4) Date: Jan. 20, 2010

(87) PCT Pub. No.: WO2009/007273
PCT Pub. Date: Jan. 15, 2009

(65) Prior Publication Data
US 2010/0166875 A1 Jul. 1, 2010

(30) Foreign Application Priority Data
Jul. 6, 2007 (EP) .................................... 07111921

(51) Int. Cl.
| | | |
|---|---|---|
| *A61K 9/50* | (2006.01) | |
| *A23L 1/27* | (2006.01) | |
| *A61K 47/36* | (2006.01) | |
| *C09B 67/20* | (2006.01) | |
| *A23L 2/58* | (2006.01) | |
| *C09B 61/00* | (2006.01) | |
| *C09B 67/46* | (2006.01) | |
| *A23L 5/42* | (2016.01) | |
| *A23L 5/43* | (2016.01) | |
| *A23L 5/44* | (2016.01) | |

(52) U.S. Cl.
CPC ............ *C09B 67/0066* (2013.01); *A23L 2/58* (2013.01); *A23L 5/42* (2016.08); *A23L 5/43* (2016.08); *A23L 5/44* (2016.08); *C09B 61/00* (2013.01); *C09B 67/009* (2013.01)

(58) Field of Classification Search
CPC ... C09B 67/0066; C09B 61/00; C09B 67/009; A23L 2/58; A23L 5/42; A23L 5/43; A23L 5/44
See application file for complete search history.

(56) References Cited

U.S. PATENT DOCUMENTS

| | | | |
|---|---|---|---|
| 3,110,598 A | 11/1963 | Muller et al. | |
| 3,998,753 A * | 12/1976 | Antoshkiw | C07C 403/24 252/363.5 |
| 4,844,934 A | 7/1989 | Lueddecke et al. | |
| 5,571,547 A | 11/1996 | Serpelloni et al. | |
| 6,162,474 A | 12/2000 | Chen et al. | |
| 6,500,473 B1 * | 12/2002 | Koehler et al. | 426/89 |
| 8,765,180 B2 | 7/2014 | Koehler | |
| 2002/0026886 A1 * | 3/2002 | Isager et al. | 106/471 |
| 2002/0110599 A1 * | 8/2002 | Auweter | A23L 33/155 424/499 |
| 2003/0165572 A1 | 9/2003 | Auriou | |
| 2005/0152851 A1 | 7/2005 | Kaminski | |
| 2005/0169999 A1 | 8/2005 | Eller et al. | |
| 2008/0113076 A1 | 5/2008 | Klingenberg | |
| 2008/0207775 A1 | 8/2008 | Masaeus et al. | |
| 2010/0166875 A1 | 7/2010 | Koehler et al. | |
| 2012/0107378 A1 | 5/2012 | Koehler et al. | |

FOREIGN PATENT DOCUMENTS

| | | |
|---|---|---|
| EP | 0 239 086 B1 | 3/1987 |
| EP | 1 300 394 B1 | 7/2000 |
| EP | 1 066 761 B1 | 9/2004 |
| EP | 1 967 081 A1 | 3/2007 |
| EP | 1 875 814 A1 | 1/2008 |
| EP | 1 964 479 A1 | 9/2008 |
| EP | 2 011 835 A1 | 1/2009 |
| EP | 1 471 151 B1 | 11/2009 |
| EP | 0 876 109 B2 | 5/2011 |
| JP | 11-043430 A | 2/1999 |
| WO | WO 91/06292 | 5/1991 |
| WO | WO 97/26802 A1 | 7/1997 |
| WO | WO 02/08182 A1 | 1/2002 |
| WO | WO 2006/032339 A1 | 3/2006 |
| WO | WO 2007/003543 A1 | 1/2007 |
| WO | WO 2007/009601 A1 | 1/2007 |
| WO | WO 2007/090614 A1 | 8/2007 |
| WO | WO 99/03449 A1 | 1/2009 |
| WO | WO 2009/007273 A2 | 1/2009 |

OTHER PUBLICATIONS

Bixin; retrieved from internet: https://scifinder.cas.org/scifinder/view/scifinder/scifinderExplore.jsf. Retrieved on Oct. 14, 2016.*
Monitoring Pharmaceutical Solvent Drying Processes Using the Thermo Scientific Prima PRO Process Mass Spectrometer (https://tools.thermofisher.com/content/sfs/brochures/AN_PPSD_0513.pdf.*
Understanding Concentration and Evaporation Technology: Part 1: Basic Principles of Commonly Used Evaporation Techniques (http://www.americanlaboratory.com/914-Application-Notes/130187-Understanding-Concentration-and-Evaporation-Technology-Part-1-Basic-Principles-of-Commonly-Used-Evaporation-Techniques/.*
Database WPI Week 200646, XP002465172, Jun. 22, 2006.
Notice of Allowance dated Mar. 27, 2014 issued in connection with U.S. Appl. No. 13/143,475.
Anonymous, "Specialty starches provide superior emulsification and encapsulation", Jan. 21, 2004, pp. 1-2 retrieved from the Internet. XP002569407.
Jackson, "Sugar Confectionery Manufacture", Second Edition, Blackie Academic and Professional 1995 (Table of Contents).
International Search Report issued in PCT/EP2009/067952 dated Mar. 24, 2010.
International Search Report issued in PCT/EP2010/062291 dated Nov. 17, 2010.

(Continued)

*Primary Examiner* — Hong Yu
(74) *Attorney, Agent, or Firm* — Foley & Lardner LLP

(57) ABSTRACT

The present invention relates to a colouring composition to be used in the manufacture of food and pharmaceutical products.

23 Claims, No Drawings

(56) References Cited

OTHER PUBLICATIONS

Smith et al., "Food Additives Data Book", BLackwell Science Ltd. XP002524085, pp. 304-306 (2003).
Dursch et al., "Microencapsulation properties of two different types of n-octenylsuccinate-derivatised starch", *Eur Food Res Technol*, vol. 222, pp. 155-164 (Oct. 20, 2005).
Furia, "Colour Additives in Food", CRC Handbook of Food Additives, CRC Press, pp. 612-613 (Jan. 1, 1981).

* cited by examiner

COLOURING COMPOSITION COMPRISING STARCH DERIVATIVES AS A HYDROCOLLOID

DESCRIPTION

The present invention relates to a colouring composition to be used in the manufacture of food and pharmaceutical products.

Colouring agents containing natural or synthetic colouring substances are commonly used as additives in the manufacturing of food products and pharmaceutical products. A wide range of such colouring agents is commercially available making it possible for the manufacturer, where a particular colour tone is desired, to select a single colouring agent having the desired colour or a mixture of colouring agents which in an appropriate combination impart the desired colour to the product. Alternatively, the manufacturer may wish to use an agent which, in addition to its colouring effect, has a health improving effect and hence select such a single health improving agent or a mixture of such agents.

The commercially available colouring agents can contain synthetic substances including substances that are also normally referred to as dyes or azodyes, or such agents can contain pigments or other colouring substances of natural origin, e.g. in the form of plant material containing a colouring substance, or as more or less purified colouring substances separated from plant, animal or microbial materials naturally containing such substances.

Occasionally, food grade or pharmaceutically acceptable colouring agents are provided that contain colouring substances in the form of synthetic or artificial compounds having substantially the same chemical composition as natural occurring colouring substances. This type of colouring agents is also referred to in the art as "nature identical" colours. However, in the present context, the expression "naturally occurring colouring agents" is used to designate pigments or other colouring substances which are derived from a natural source.

Any of the above types of available colouring agents including agents comprising food grade or pharmaceutically acceptable natural colouring substances can be hydrophilic or hydrophobic and, thus, the colouring substances may be water-soluble, sparingly soluble in water and aqueous media or essentially water insoluble. A hydrophilic, water-soluble colouring material as such can therefore only be used for colouring a product having an aqueous phase during and/or after manufacturing. Similarly, the use of a hydrophobic and/or water-insoluble colouring material or substance as such requires that the product to be coloured has a hydrophobic or lipid phase in which the colouring substance is soluble. Certain colouring substances such as curcumin are substantially insoluble in water below neutral pH, but are soluble in alkaline aqueous media. Such compounds are referred to hereinafter as "hydrophilic, water-insoluble" substances.

However, it may be desirable to obtain the colour tone of a particular colouring substance that is insoluble or sparingly soluble in an aqueous phase or a mixture of such substances in a food product or a pharmaceutical product that does not comprise a phase in which the colouring substance is sufficiently soluble to provide the desired colouring.

There is therefore a continuous industrial need for colouring agents containing colouring substances that are water insoluble or sparingly soluble in water, which are in the form of a water-dispersible or water-miscible composition having a high colouring efficiency.

WO-A-2002/08182 describes a method for the production of a water-dispersible formulation containing carotenoids which comprises forming a suspension of carotenoid in insoluble or poorly water soluble, non-halogenated solvent, warming up said suspension to form a solution of the carotenoid in the solvent, emulsifying the solution in an aqueous solution of a mixture of at least two different food-grade starch colloids, removing the solvent, concentrating the liquid emulsion formed thereof and drying the emulsion to obtain granulates. It is required that one of the food-grade starch colloids has an improved emulsifying effect and the other an improved dispersion effect. The patent application deals predominantly with the preparation of β-carotene compositions. The obtained granulates have a particle size of 0.5 to 3 mm.

U.S. Pat. No. 3,110,598 relates to carotenoid preparations and a process for making same which comprises emulsifying a solution of a carotenoid in a volatile, water insoluble carotenoid solvent in an aqueous solution containing a swellable colloid. The volatile, water insoluble carotenoid solvent is then removed from the emulsion.

However, studies have shown that it is not possible to remove the carotenoid solvent completely. Traces of the solvent used can still be found in the colouring compositions after the attempted removal of the solvent which is not acceptable under the strict regulations of the food industry. This will become particularly critical in those cases where harmful solvents such as halogenated solvents are used.

EP-A-0239086 describes a method for the preparation of finely divided, water-dispersible carotenoid preparations comprising the steps of dissolving the carotenoid in a carrier oil at elevated temperature until the oil is saturated, quickly emulsifying the dissolved carotenoid with an aqueous protective colloid and subsequently removing the water. The method has been demonstrated by using β-carotene as the carotenoid pigment. As the protective colloid, a mixture of an ester of a long-chain fatty acid with ascorbic acid and starch which is soluble in cold water is used. The obtained emulsion may subsequently be dried.

However, as carotenoids only have a limited solubility in oil, the amount of oil to be used for dissolving the carotenoids is rather large. Consequently, the final concentration of the carotenoid in the emulsion will be low.

Furthermore, in order to achieve a complete dissolution of the carotenoid in the carrier oil, the method requires the heating of the oil phase which leads to a decrease in the colour strength of the pigment. In addition, the stability of the dissolved colour pigments may be impaired in comparison to solid colour pigments.

Moreover, carotenes are normally reddish/orange in the crystalline form but yellow in solution. This is of course a problem if a red colour shade is asked for by the customer.

It is thus the object of the present invention to provide a water-dispersible colouring composition which circumvents the above illustrated disadvantages of the state in the art.

This object is solved by a water-dispersible composition comprising at least one hydrophilic, water-insoluble solid pigment and at least 5 wt % of at least one starch octenyl succinate derivative as a hydrocolloid.

The present invention further relates to a method for preparing the water-dispersible composition comprising a suspension of at least one hydrophilic, water-insoluble solid pigment, said method comprising the preparation of a suspension of a hydrophilic, water-insoluble solid pigment by comminuting the solid pigment in an aqueous media in the presence of at least 5 wt % of at least one starch octenyl succinate derivative as a hydrocolloid.

The object is also solved by a water-dispersible composition obtainable by preparing a suspension of at least one hydrophobic, water-insoluble solid pigment by comminuting the pigment in the presence of at least 5 wt % of at least one starch octenyl succinate derivative as a hydrocolloid in an aqueous media whereby the suspension is prepared without the use of an organic solvent.

Moreover, the present invention relates to the use of the above described water-dispersible compositions for colouring an edible or pharmaceutical product. An edible or pharmaceutical product comprising the above water-dispersible composition is also provided by the present invention.

The present invention provides a water-dispersible colouring composition which is highly effective in the colouring of edible and pharmaceutical products. The water-dispersible composition comprises at least one water-insoluble solid pigment. Thus, the composition according to the invention may comprise a single colouring substance or it may contain two or more different colouring substances which allow obtaining a large scale of attractive shades of colour.

The water-insoluble solid pigment may be hydrophilic or, alternatively, hydrophobic.

In the present invention, the term "hydrophilic water-insoluble pigment" refers to a pigment which is generally insoluble in aqueous media below neutral pH but soluble in aqueous media at a pH in the alkaline range. Accordingly, the hydrophilic, water-insoluble pigment dissolves in alkaline media but precipitates at a pH level below 7.

In general, the solubility in water of a substance is specified by the saturation mass concentration of the substance in water at a given temperature. In the present invention, a pigment being sparingly or generally insoluble is understood to have a solubility in water of less than 5 g pigment/L water at 20° C.

The hydrophilic water-insoluble solid pigment can be any food grade or pharmaceutically acceptable colouring substance which is not or only sparingly soluble in water or aqueous media below neutral pH but can be made soluble by the addition of alkaline to the water or aqueous phase.

Suitable hydrophilic water-insoluble solid pigments according to the present invention are hydrophilic carotenoids, metal chelates of carminic acid, curcumin and chlorophyllin.

Carmine, also called Crimson Lake, Cochineal, Natural Red 4, C.I. 75470 or E120, is a pigment of a bright red colour obtained from *Coccus cacti*. Normally the aqueous extract is precipitated as the insoluble aluminium or aluminium calcium lake known as cochineal carmine which is soluble in alkaline aqueous media but sparingly soluble in aqueous media having a pH below about 9.

Carmine is used as a food dye in many different products such as juice, ice cream, yogurt, alcoholic beverages, sweets, eye shadow, lipstick, etc. Although principally a red dye, it is found in many foods that are shades of red, pink, and purple.

Carotenoids are widely used as colouring agents in the food industry and in the pharmaceutical field. Known hydrophilic, water-insoluble carotenoids, which can be used in the present invention, are norbixin and crocetin.

Curcumin is the principal curcuminoid of the Indian curry spice turmeric. The curcuminoids are polyphenols and are responsible for the yellow colour of turmeric. Curcumin can exist in at least two tautomeric forms, keto and enol. The enol form is more energetically stable in the solid phase and in solution. Since curcumin is brightly coloured, it may be used as a food colouring. As a food additive, its E number is E100.

Chlorophyllin is based on water soluble salts of derivatives of phaeophobide a or b. As a food colouring agent chlorophyllin has the E number E140. Chlorophyllin is also available as nutritional supplement. Preliminary evidence from in vitro and animal studies suggests that these substances may have anticarcinogenic activity.

The term "hydrophobic water-insoluble pigment" as used in the present invention is to be understood that the pigment in the amounts used herein is water-insoluble or sparingly soluble in water so that the pigment will occur as a separate phase in aqueous media and/or has such a high degree of hydrophobicity that it can not be homogenously dispersed or suspended in water without the use of considerable shear stress and/or addition of surface active substances such as emulsifying agents. Most of such pigments will be soluble in lipid substances. Hydrophobic compounds may also be aerophilic.

Suitable hydrophobic water-insoluble solid pigments for use in the present invention are hydrophobic carotenoids such as β-carotene, bixin, apocarotenals, canthaxanthin, saffron, crocin, capsanthin, capsorubin, lutein, astaxanthin, rubixanthin, violaxanthin, rhodoxanthin, lycopene and derivatives thereof. Preferably, bixin is used in the present invention.

In the following, the term "water-dispersible solid pigments" encompasses both, the hydrophilic and hydrophobic pigments as illustrated above.

The water-insoluble solid pigments are suspended in water or an aqueous medium comprising at least one hydrocolloid selected from starch octenyl succinate derivatives. Starch octenyl succinate is the common name given to starch n-octenyl succinate which is made by treating starch with n-octenyl succinic anhydride at pH 8-8.5. This starch derivative is anionic due to a carboxyl group and hydrophobic due to the $C_8$-alkene chain.

Preferably, starch octenyl succinate derivatives having a degree of substitution (D.S.) up to 0.11, more preferably up to 0.03 are used within the present invention.

It is assumed that the hydrocolloid acts as a protective colloid, that it prevents agglomeration of the pigments and that it provides wetting and dispersing activity.

The hydrocolloid is suitably used in an amount of at least 5% by weight based on the total weight of the composition. Preferably, the amount of the hydrocolloid exceeds 10% wt, even more preferred at least 20 wt % of the hydrocolloid are used. In order to obtain satisfying colouring results, the amount of the starch n-octenyl succinate derivates should not exceed an upper range of 50 wt %.

There are several ways to classify the colour or a substance. Generally the colour characteristics of a substance may be characterised by three parameters: the hue, the saturation and the lightness.

Hue is an attribute associated with each of the dominant wavelengths of the visible spectrum and reflects the dominant colour of the composition (reddish, yellowish, bluish, etc.). Saturation pertains to the intensity of the colour composition and lightness reflects the amount of white or black in the colour composition.

When measured in a tristimulus system, e.g. a Minolta 310 apparatus, saturation is expressed by the parameter "chroma", hue is expressed in degrees by the parameter H and lightness is expressed by the parameter L. Chroma, H and L, measured at a standard pigment concentration, may be used as a way of characterising and comparing different colour preparations of the same pigment. Especially the chroma is very important. Generally, a high chroma for a certain pigment concentration is desirable. Accordingly, a colour may be characterised by its chroma value reflecting the "colouring strength" or "colouring power" of the substance.

Surprisingly, it has been found that the use of starch n-octenyl succinate derivatives as the hydrocolloid in colouring compositions allows high concentrations of a hydrocolloid in the composition whereby the viscosity of the thus obtained suspension can be maintained on a low level. If the viscosity becomes too high, comminuting of the particles becomes impossible. Additionally, the handling of the composition will be impaired as it will not be possible to pour the liquid product.

A high concentration of the hydrocolloid on the other hand allows high concentrations of the pigment in the colouring composition which is advantageous from a monetary point of view. Moreover, the colouring compositions of the present invention may provide a highly intense colour to an edible or pharmaceutical product in comparison to commonly used colouring compositions.

The selection of a suitable amount of the solid pigment in the composition according to the present invention is based on the particular type of pigment and the particular intended application for the composition. Typically, an amount of 2.5 to 60 wt % of the solid pigment is used. In preferred embodiments, 5 to 50 wt % of the solid pigments are preferably used.

The water-dispersible composition of the present invention may further comprise a plasticizing agent such as a carbohydrate or a sugar alcohol or a mixture thereof. The carbohydrate is preferably selected from the group consisting of a monosaccharide, a disaccharide and an oligosaccharide such as glucose, lactose, fructose and sucrose. The sugar alcohol can e.g. be selected from the group consisting of sorbitol, mannitol, dulcitol, adonitol and glycerol. The amount of the plasticizing agent is preferably in the range of 0-95 wt %, preferably in the range of 5-50 wt %, more preferably in the range of 10-30 wt % based on the total weight of the composition.

The water-dispersible composition may further comprise at least one further component such as an antioxidant, a stabilising agent, a viscosity modifying agent, an alcohol, a resin or a preservative agent.

As a food colouring composition the composition may also comprise flavouring agents, acids such as citric acid and tartaric acid, or sweeteners.

According to the present invention, the water-dispersible composition has a water content of more than 5 wt % based on the total weight of the composition. However, the water content can be easily adapted within a wide range in compliance with specific customer demands.

For prolonged storage and easier transportation the composition of the invention may be dried to a water content of less than 5 wt %. Such a composition appears as a dry product which, depending on the drying process, may be in the form of e.g. a powder, a granulate or a flaked product. The water content of the composition may be reduced by employing conventional drying methods known to a person skilled in the art. As an example, spray drying using a standard laboratory spray drier can be suitably used.

Thus, the final dry composition may optionally contain a spray drying excipient such as a sugar, a maltodextrine or a starch.

Other suitable methods include evaporation of water under reduced pressure, lyophilizing of the composition, spray cooling, belt drying and fluid bed drying. The person skilled in the art will readily apply the appropriate method for drying depending on the intended use of the dried composition.

The present invention further provides a method for preparing the water-dispersible compositions. In a first step, a suspension of the colouring substance is prepared by mixing the colouring substance with at least one hydrocolloid selected from starch octenyl succinate derivatives in an aqueous media. The mixing step can be carried out using any conventional mixing or blending method known in the art.

The step of suspending the colouring substance can, if desired, be carried out in at least two steps in which an additional amount of starch is added in a second or any subsequent step.

As mentioned above, the invention encompasses colouring substances that are water-insoluble or sparingly soluble in aqueous media below neutral pH but soluble in aqueous media at about neutral pH. Examples of such substances include copper-chlorophyllin and salts thereof. It will be appreciated that it is possible to obtain solid particles of such colouring substances by precipitation of the colouring substance caused by acidifying an alkaline or neutral solution of the substance.

Alternatively, a solution of the colouring substance may be carefully mixed with an acidified solution of the hydrocolloid which causes the colouring substance to precipitate.

Suitable acids for acidifying the solution include citric acid, lactic acid, malic acid, acetic acid, hydrochlorid acid, sulphuric acid and phosphoric acid.

The method of the invention may comprise the addition to the aqueous phase of a plasticizing agent such as a carbohydrate or a sugar alcohol either before or after the mixing of the colouring substance, and/or it may include the incorporation in the suspension of at least one further component e.g. selected from an antioxidant, a stabilising agent, a viscosity modifying agent, an alcohol, a resin or a preservative agent.

The mixing step is followed by comminution to obtain small discrete pigment bodies. Preferably, comminuting is continued to an average particle diameter of less than 10 µm, more preferably less than 5 µm and even more preferably less than 2 µm. Most preferably, the average particle diameter is less than 1 µm.

Applicable comminution methods include milling, e.g. using a ball mill.

In a preferred embodiment, the preparation of the water-dispersible composition is performed without the introduction of organic solvents, in particular polar organic solvents. Organic solvents which are frequently used to dissolve e.g. hydrophobic colouring substances such as hydrophobic carotenoids are detrimental to the health of the consumer and should therefore be avoided. In addition, it has been found that organic solvents are difficult to remove from the composition and generally traces of the solvent are still detectable in the final product. By avoiding the use of organic solvents in the preparation process, the compositions of the present invention are highly safe for the consumer.

In a subsequent step, the suspension may be dried to a water content below 5 wt %.

The present invention further relates to the use of the water-dispersible composition as a colouring agent in the manufacturing of an edible product. As used herein, the expression "edible product" denotes any solid or liquid food product. Edible products also include the product types referred to as "nutraceuticals", "functional foods" or "health foods" which terms are used interchangeably herein. Said product types encompass food products or food supplements comprising components that are considered to confer certain health improving characteristics. Such products may be in any conventional forms including products in tablet or capsule dosage forms which e.g. may comprise separate compartments. It will be appreciated that when a composition according to the present invention will be used in the manufacturing of such nutraceuticals, the colouring substance can in addition to its colouring effect also confer a nutritionally and/or health improving effect to such products. As an example, β-carotene, which is a colouring substance belonging to the class of carotenoids, has certain pharmaceutical and/or health improving effects. Other examples of colouring substances or derivatives thereof having pharmaceutical or health improving effects include tocophenols, tocotrienols and polyphenols.

In further preferred embodiments, the compositions of the present invention are useful for colouring liquid food products such soft drinks, carbonated beverage products and milk products.

Several food products such as soft drinks, juices, soups and sauces are manufactured as initially liquid products which are subsequently dehydrated to a dry storage stable product typically having a water content of at the most 10 wt %. The water-dispersible compositions of the present invention are also useful for the colouring of such products in that the colouring of the products after rehydration will substantially be of the same strength and hue as the starting liquid food product prior to dehydration.

The water-dispersible compositions of the present invention may further be used as colouring agents in the manufacturing of pharmaceutical products in solid form such as tablets, pills, capsules or suppositories or in liquid form such as solutions, suspensions or dispersions.

The present invention is further illustrated by the following examples.

EXAMPLES

In the following, the preparation of water-dispersible compositions comprising a hydrophilic, water-insoluble solid pigment and starch octenyl succinate derivates is described. Particle size measurements were performed on a Malvern Mastersizer, Malvern Instruments, Worsc. WR 14 1XZ, UK.

The colouring characteristics of these compositions were tested using a Minolta Tristimulus CT 310 apparatus in a standardised soft drink system at a standard pigment content. For bixin, the colouring substance content was 20 ppm, for the metal chelates of carminic acid 20 ppm, for curcumin 30 ppm and for chlorophyllin 30 ppm.

The soft drink system was prepared from a concentrate having the following composition:

| | |
|---|---|
| Sucrose | 430.0 g |
| Na-benzoate, food grade | 0.7 g |
| K-sorbate, food grade | 0.9 g |
| Ascorbic acid | 0.1 g |
| Citric acid mono-hydrate, food-grade | 8.6 g |
| Demineralised water | Ad 1 litre |

The concentrate was diluted 1:4 before use with demineralised water. The diluted ready-to-use soft drink medium had a pH of 3.0±0.2.

The measured tristimulus values were compared with specifications for commercial pigment products. The key parameter is the so-called "chroma" value which provides an indication of the colouring strength or "colouring power" of the colouring substance suspension product. For curcumin, the chroma value should exceed 25, for chlorophyllin the value should exceed 19, for metal chelates of carminic acid the value should exceed 33 and for carotenoids the value should exceed 14 at the above-mentioned pigment levels.

In the following examples and comparative examples, the abbreviation "nOSA" refers to n-octenyl succinate anhydride. Weight percentages are based on the total weight of the composition.

Comparative Example 1

A suspension consisting of 15.0 wt % of non-nOSA modified starch (Ultra-Tex 3, National Starch, E1442), 31.5 wt % turmeric powder and 53.5 wt % demineralised water was prepared. When the starch had been dissolved and the turmeric powder had been sufficiently wetted it was attempted to mill the suspension through a laboratory ball mill (Dispermat SL VMA-Getzmann GmbH). This was not possible due to a too high viscosity of the suspension.

Comparative Example 2

A suspension consisting of 5.0 wt % of non-nOSA modified starch (Ultra-Tex 3, National Starch, E1442), 16.5% turmeric powder and 78.5 wt % demineralised water was prepared. When the starch had been dissolved and the turmeric powder had been sufficiently wetted it was attempted to mill the suspension through a laboratory ball mill (Dispermat SL VMA-Getzmann GmbH). This was not possible due to a too high viscosity of the suspension.

Comparative Example 3

A suspension consisting of 5.0 wt % of non-nOSA modified starch (Ultra-Tex 3, National Starch, E1442), 11.5% turmeric powder and 83.5 wt % demineralised water was prepared. When the starch had been dissolved and the turmeric powder had been sufficiently wetted the suspension was run through a laboratory ball mill (Dispermat SL VMA-Getzmann GmbH). After 5 runs through the mill a chroma value of 8 was obtained which is significantly below the desired minimum value of 25.

A mean particle diameter of 15 μm was measured.

Comparative Example 4

A suspension consisting of 10.0% of non-nOSA modified starch (Ultra-Tex 2000, National Starch, E1442), 31.5 wt % turmeric powder and 58.5 wt % demineralised water was prepared. When the starch had been dissolved and the turmeric powder had been sufficiently wetted it was attempted to mill the suspension through a laboratory ball mill (Dispermat SL VMA-Getzmann GmbH). This was not possible due to a too high viscosity of the suspension.

Comparative Example 5

A suspension consisting of 5.0 wt % of non-nOSA modified starch (Ultra-Tex 2000, National Starch, E1442), 6.5 wt % turmeric powder and 88.5 wt % demineralised water was prepared. When the starch had been dissolved and the turmeric powder had been sufficiently wetted the suspension was run through a laboratory ball mill (Dispermat SL VMA-Getzmann GmbH). After 5 runs through the mill a chroma value of 15 was obtained which is significantly below the desired minimum value of 25.

A mean particle diameter of 7 μm was measured.

Comparative Example 6

A suspension consisting of 10.0% of non-nOSA modified starch (Instant Textaid A, National Starch, E1412), 11.5 wt % turmeric powder and 78.5 wt % demineralised water was prepared. When the starch had been dissolved and the turmeric powder had been sufficiently wetted it was attempted to mill the suspension through a laboratory ball mill (Dispermat SL VMA-Getzmann GmbH). This was not possible due to a too high viscosity of the suspension.

Comparative Example 7

A suspension consisting of 5.0 wt % of non-nOSA modified starch (Instant Textaid A, National Starch, E1412), 6.5 wt % turmeric powder and 88.5% demineralised water was prepared. When the starch had been dissolved and the turmeric powder had been sufficiently wetted the suspension was run through a laboratory ball mill (Dispermat SL VMA-Getzmann GmbH). After 5 runs through the mill a chroma value of 7 was obtained which is significantly below the desired minimum value of 25.

A mean particle diameter of 4 μm was measured.

Comparative Example 8

A suspension consisting of 3.33 wt % of nOSA modified starch (Cleargum, Roquette Frères, E1450), 10.0 wt % turmeric powder, 46.7 wt % sucrose and 40.0 wt % demineralised water was prepared. When the starch had been dissolved and the turmeric powder had been sufficiently wetted the suspension was run through a laboratory ball mill (Dynomill type KDL). After 2 runs through the mill a chroma value of 12 was obtained which is significantly below the desired minimum value of 25.

Example 1

A suspension consisting of 20.0 wt % of nOSA modified starch (HiCap 100, National Starch, E1450), 31.5 wt % turmeric powder and 48.5% demineralised water was prepared. When the starch had been dissolved and the turmeric powder had been sufficiently wetted the suspension was run through a laboratory ball mill (Dispermat SL VMA-Getzmann GmbH). After 5 runs through the mill a chroma value of 37 was obtained which is significantly above the desired minimum value of 25.

A mean particle diameter of 0.5 μm was measured.

Example 2

A suspension consisting of 15.0 wt % of nOSA modified starch (HiCap 100, National Starch, E1450), 31.5 wt % turmeric powder and 53.5 wt % demineralised water was prepared. When the starch had been dissolved and the turmeric powder had been sufficiently wetted the suspension was run through a laboratory ball mill (Dispermat SL VMA-Getzmann GmbH). After 5 runs through the mill a chroma value of 44 was obtained which is significantly above the desired minimum value of 25.

A mean particle diameter of 0.5 μm was measured.

The colour preparation prepared in example 2 was subsequently dried on a standard laboratory spray drier.

Example 3

A solution of 50.0 g of Cu-chlorophyllin in 100.0 g of demineralised water was prepared (in the following referred to as solution (1)).

Another solution of 100.0 g of nOSA modified starch (Capsul TA, National Starch, E1450) and 17.5 g of citric acid in 232.5 g of demineralised water was prepared (in the following referred to as solution (2)).

Solution (1) was slowly added to solution (2) under stirring. In this way a suspension of precipitated chlorophyllin was prepared. The suspension was run through a laboratory ball mill (Dispermat SL VMA-Getzmann GmbH) for one hour. After 5 runs through the mill a chroma value of 20 was obtained which is above the desired minimum value of 18.

A mean particle diameter of 3.66 μm was measured.

Example 4

A suspension consisting of 10.0 wt % of nOSA modified starch (Capsul TA, National Starch, E1450), 20.0% of carmine lake, 5.0 wt % of propylene glycol and 65.0 wt % demineralised water was prepared. When the starch had been dissolved and the carmine lake powder had been sufficiently wetted the suspension was run through a laboratory ball mill (Dispermat SL VMA-Getzmann GmbH). After 5 runs through the mill a chroma value of 34 was obtained which is above the desired minimum value of 33.

A mean particle diameter of 1.5 μm was measured.

Example 5

A suspension consisting of 20.0 wt % of nOSA modified starch (Capsul TA, National Starch, E1450), 17.0 wt % carmine lake (Chr. Hansen A/S) and 63.0 wt % demineralised water was prepared. When the starch had been dissolved and the carmine lake had been sufficiently wetted the suspension was run through a laboratory ball mill (Dispermat SL VMA-Getzmann GmbH). After 2 runs through the mill a chroma value of 35 was obtained which is above the desired minimum value of 33.

Example 6

A suspension consisting of 25.0 wt % of nOSA modified starch (HiCap 100, National Starch, E1450), 26.5 wt % turmeric powder and 48.5 wt % demineralised water was prepared. When the starch had been dissolved and the turmeric powder had been sufficiently wetted the suspension was run through a laboratory ball mill (Dispermat SL VMA-Getzmann GmbH). After 2 runs through the mill a chroma value of 43 was obtained which is above the desired minimum value of 25.

Example 7

A suspension consisting of 20.0 wt % of nOSA modified starch (HiCap 100, National Starch, E1450), 22 wt % crystalline bixin (Chr. Hansen A/S) and 58.0 wt % demineralised water was prepared. When the starch had been dissolved and the crystalline bixin had been sufficiently wetted the suspension was run through a pilot scale ball mill (FrymaKoruna MS12, Romaco AG, FrymaKoruna, CH 4310 Rheinfelden, Switzerland). After 3 runs through the mill a chroma value of 18 was obtained which is above the desired minimum value of 14.

Example 8

A suspension consisting of 20.0 wt % of nOSA modified starch (HiCap 100, National Starch, E1450), 17 wt % crystalline bixin (Chr. Hansen A/S) and 63.0 wt % demineralised water was prepared. When the starch had been dissolved and the crystalline bixin had been sufficiently wetted the suspension was run through a pilot scale ball mill (FrymaKoruna MS12, Romaco AG, FrymaKoruna, CH 4310 Rheinfelden, Switzerland) (3 runs through the mill). After dilution to 35% dry matter, the colour preparation was dried on a standard laboratory spray drier.

Example 9

A suspension consisting of 15.0 wt % of nOSA modified starch (HiCap 100, National Starch, E1450), 26.5 wt % turmeric powder and 53.5 wt % demineralised water was prepared. When the starch had been dissolved and the turmeric powder had been sufficiently wetted the suspension was run through a pilot scale ball mill (FrymaKoruna MS12, Romaco AG, FrymaKoruna, CH 4310 Rheinfelden, Switzerland) (3 runs through the mill). After dilution to 25 wt % dry matter, the colour preparation was dried on a standard laboratory spray drier.

Example 10

First a solution consisting of 300 g of nOSA modified starch (HiCap 100, National Starch, E1450), 45 g of citric acid and 630 grams of demineralised water was prepared.

Then a solution of 225 g of sodium copper chlorophyllin and 300 g of demineralised water was prepared.

The sodium copper chlorophyllin solution was then slowly added to the nOSA starch solution-citric acid under vigorous stirring.

The resulting suspension was run through a pilot scale ball mill (FrymaKoruna MS12, Romaco AG, FrymaKoruna, CH 4310 Rheinfelden, Switzerland). After 3 runs through the mill a chroma value of 22 was obtained which is above the desired minimum value of 18.

In Table 1 below, the chroma values for the water-dispersible compositions are summarised:

TABLE 1

Chroma values of water dispersible colouring substance products in a standard soft drink medium.

| Example | Pigment | Starch type and amount | Found chroma value | Desired chroma value (minimum specification) | Found: desired chroma value |
|---|---|---|---|---|---|
| Comparative Example 1 | Turmeric | non-nOSA Ultra-Tex 3, E 1442 15 wt % | n.a. | 25 | n.a. |
| Comparative Example 2 | Turmeric | non-nOSA Ultra-Tex 3, E 1442 5 wt % | n.a. | 25 | n.a. |
| Comparative Example 3 | Turmeric | non-nOSA Ultra-Tex 3, E 1442 5 wt % | 8 | 25 | 0.32 |
| Comparative Example 4 | Turmeric | non-nOSA Ultra-Tex 2000, E 1442 10 wt % | n.a. | 25 | n.a. |
| Comparative Example 5 | Turmeric | non-nOSA Ultra-Tex 2000, E 1442 5 wt % | 15 | 25 | 0.60 |
| Comparative Example 6 | Turmeric | non-nOSA Instant Textaid, E 1412 10 wt % | n.a. | 25 | n.a. |
| Comparative Example 7 | Turmeric | non-nOSA Instant Textaid, E 1412 5 wt % | 7 | 25 | 0.28 |
| Comparative Example 8 | Turmeric | nOSA Clear-Gum, E 1450 3.33 wt % | 12 | 25 | 0.48 |
| Example 1 | Turmeric | nOSA HiCap 100, E 1450 20 wt % | 37 | 25 | 1.48 |
| Example 2 | Turmeric | nOSA HiCap 100, E 1450 15 wt % | 44 | 25 | 1.76 |

TABLE 1-continued

Chroma values of water dispersible colouring substance products in a standard soft drink medium.

| Example | Pigment | Starch type and amount | Found chroma value | Desired chroma value (minimum specification) | Found: desired chroma value |
|---|---|---|---|---|---|
| Example 3 | Cu-chlorophyllin | nOSA Capsul TA, E 1450 20 wt % | 20 | 18 | 1.11 |
| Example 4 | Carmine lake | nOSA Capsul TA, E 1450 10% | 34 | 33 | 1.03 |
| Example 5 | Carmine lake | nOSA Capsul TA, E 1450 8.5 wt % | 35 | 33 | 1.06 |
| Example 6 | Turmeric | nOSA Clear-Gum, E 1450 25 wt % | 43 | 25 | 1.72 |
| Example 7 | Crystalline bixin | nOSA HiCap 100, E 1450 20 wt % | 18 | 14 | 1.29 |
| Example 8 | Crystalline bixin | nOSA HiCap 100, E 1450 20 wt % | n.a. | 14 | n.a. |
| Example 9 | Turmeric | nOSA HiCap 100, E 1450 15 wt % | n.a. | 25 | n.a. |
| Example 10 | Sodium Cu-chlorophyllin | nOSA HiCap 100, E 1450 20 wt % | 22 | 18 | 1.17 |

REFERENCES

1. WO-A-2002/08182
2. U.S. Pat. No. 3,110,598
3. EP-A-0239086

The invention claimed is:

1. A water-dispersible composition comprising at least one hydrophilic or hydrophobic, water-insoluble solid pigment comprising metal chelates of carminic acid, and at least 5 wt % of at least one starch octenyl succinate derivative as a hydrocolloid.

2. The water-dispersible composition according to claim 1, wherein the solid pigment is insoluble in aqueous media at below neutral pH but soluble in aqueous media at a pH in the alkaline range.

3. The water-dispersible composition according to claim 1 wherein the solid pigment has an average particle diameter of less than 10 μm.

4. The water-dispersible composition according to claim 1 wherein the solid pigment has an average particle diameter of less than 5 μm.

5. The water-dispersible composition according to claim 1 wherein the solid pigment has an average particle diameter of less than 2 μm.

6. The water-dispersible composition according to claim 1 wherein the at least one hydrocolloid is present in an amount of at least 10 wt % based on the total composition.

7. The water-dispersible composition according to claim 1 wherein the at least one hydrocolloid is present in an amount of at least 20 wt % based on the total composition.

8. The water-dispersible composition according to claim 1 having a water content of more than 5 wt % based on the total composition.

9. The water-dispersible composition according to claim 1 having a water content of less than 5 wt % based on the total composition.

10. A water-dispersible composition obtained by preparing a suspension of at least one hydrophilic or hydrophobic, water-insoluble solid pigment comprising metal chelates of carminic acid by comminuting the pigment in the presence of at least 5 wt % of at least one starch octenyl succinate derivative as a hydrocolloid in an aqueous media.

11. The water-dispersible composition according to claim 10 wherein the solid pigment has an average particle diameter of less than 10 μm.

12. The water-dispersible composition according to claim 10 wherein the solid pigment has an average particle diameter of less than 5 μm.

13. The water-dispersible composition according to claim 10 wherein the solid pigment has an average particle diameter of less than 2 μm.

14. The water-dispersible composition according to claim 10 wherein the at least one hydrocolloid is present in an amount of at least 10 wt %.

15. The water-dispersible composition according to claim 10 wherein the at least one hydrocolloid is present in an amount of at least 20 wt %.

16. The water-dispersible composition according to claim 10 wherein the water content in the composition is reduced to less than 5 wt %.

17. An edible product comprising a water-dispersible composition according to claim 1.

18. A pharmaceutical product comprising a water-dispersible composition according to claim 1.

19. A method of colouring an edible or pharmaceutical product, the method comprising adding to the edible or pharmaceutical product the water-dispersible composition of claim 1.

20. The water-dispersible composition according to claim 1, wherein the ratio of the total amount of starch octenyl succinate derivative present to the total amount of pigment present is from 1:2 to 2:1 (weight/weight).

21. The water-dispersible composition according to claim 1, wherein the composition does not contain an organic solvent.

22. The water-dispersible composition according to claim 10, wherein the ratio of the total amount of starch octenyl succinate derivative present to the total amount of pigment present is from 1:2 to 2:1 (weight/weight).

23. The water-dispersible composition according to claim 10, wherein the composition does not contain an organic solvent.

\* \* \* \* \*